No. 770,245. PATENTED SEPT. 13, 1904.
L. E. ROBY.
FEED FOR SEEDING MACHINES.
APPLICATION FILED JULY 2, 1903.
NO MODEL. 2 SHEETS—SHEET 1.
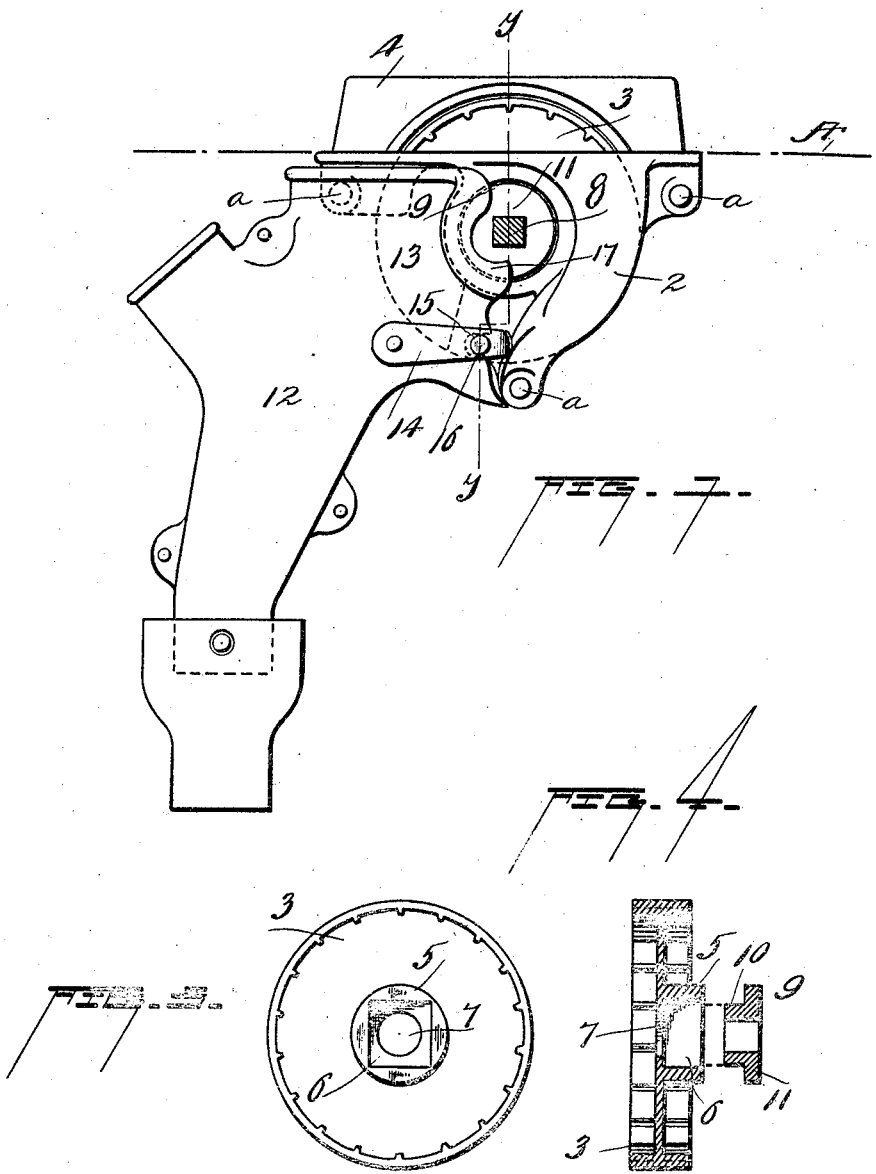

No. 770,245. PATENTED SEPT. 13, 1904.
L. E. ROBY.
FEED FOR SEEDING MACHINES.
APPLICATION FILED JULY 2, 1903.
NO MODEL. 2 SHEETS—SHEET 2.
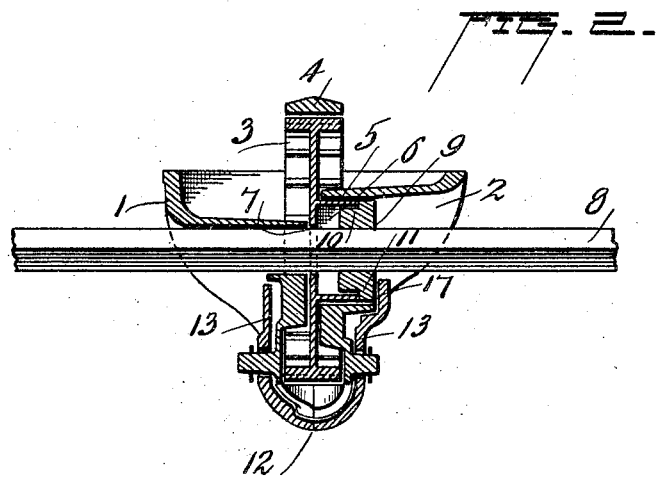
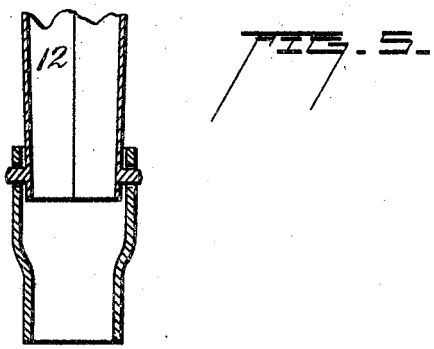
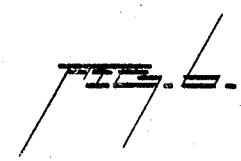
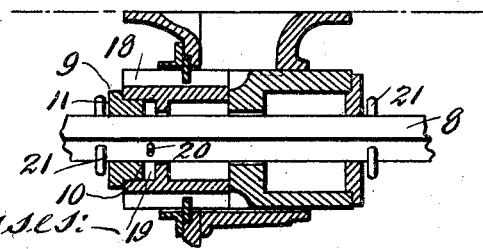
Witnesses:
Inventor,
Luther E. Roby
By W. V. Tefft
Atty.

No. 770,245.

Patented September 13, 1904.

UNITED STATES PATENT OFFICE.

LUTHER E. ROBY, OF PEORIA, ILLINOIS.

FEED FOR SEEDING-MACHINES.

SPECIFICATION forming part of Letters Patent No. 770,245, dated September 13, 1904.

Application filed July 2, 1903. Serial No. 164,082. (No model.)

*To all whom it may concern:*

Be it known that I, LUTHER E. ROBY, a citizen of the United States, residing at Peoria, in the county of Peoria and State of Illinois, have invented certain new and useful Improvements in Feeds for Seeding-Machines; and I do hereby declare that the following is a full, clear, and exact description of the invention, which will enable others skilled in the art to which it appertains to make and use the same.

This invention has reference to improvements in the "feed" for seeding-machines, and has special reference to the feed for grain-drills and seeding-machines using "feed-wheels."

The object of the invention is to provide clutch devices adapted when engaging coacting parts of the feed to fixedly connect the same for rotation with a driving-shaft and when the parts are released release the feed and permit of the shaft rotating independent of the feed.

With these ends in view my invention consists in certain features of novelty in the construction, combination, and arrangement of parts whereby the said objects and certain other objects hereinafter appearing are accomplished, all as will now be fully described with reference to the accompanying drawings, and more particularly pointed out in the claims.

In the said drawings, Figure 1 represents a side elevation of so much of a feed-wheel and its component parts as will illustrate my improvement, which is shown attached thereto. Fig. 2 is a section on the line Y Y of Fig. 1. Fig. 3 is a face view of a feed-wheel. Fig. 4 is a cross-section of feed-wheel, also showing in section the clutch device adapted to connect the feed with the driving-shaft. Fig. 5 shows certain details of construction in the seed-spout to which the usual tube is connected. Fig. 6 represents in cross-section a modified form of roller with my improvements attached.

In grain-drills or seeding-machines, the class to which my improvements more particularly belong, a hopper is provided, and secured to the bottom of such hopper is a series of seed-cups spaced at suitable distances apart from each other, thereby enabling the machine to plant in rows at given distances. It is my aim in this invention to vary the distances between the seed-cups—that is, cut out a number of them whenever it is so desired—and thereby plant in rows of varying widths. In the cups are feed-wheels actuated by a driving-shaft which receives its power from the ground-wheels.

I have not thought it necessary to show or describe any part or framework of the machine, as it is well known, but to only show and describe the features of the seed-cup, feed-wheel, and component parts as will best illustrate and show the improvement which I have made upon such feeding device.

Patent No. 324,722 to C. E. Patric, dated August 18, 1885, is substantially the form of feeding device which I have selected to illustrate my improvement, although in Fig. 6 a modified construction of the feed-roller is shown. The seed-cup is formed of the two half-sections 1 2, attached to each other at *a* and suitably secured to the under side of a hopper, the bottom of a hopper represented by dotted lines A. In Figs. 1 and 2, 3 indicates a feed-wheel, a portion of which projects into the hopper, and the periphery of the wheel is covered by a bridge-plate 4, so that there is no contact between the flange of the wheel and the grain in the hopper. Extending laterally from one side of the central body portion of the wheel is shown a member, boss, or hub portion 5, forming a bearing for the feed in the wall 2 of the cup and having the squared opening 6, which communicates with a reduced circular opening 7 in the body of the wheel.

A shaft 8 substantially square in contour passes through the series of seed-cups formed of the sections 1 and 2 and through the circular opening 7 in the feed. By reason of such circular opening 7 if no means were provided to fix the feed to the shaft the shaft would rotate while the feed remained stationary. I accomplish the fixing of the feed to the shaft by providing a member or clutch part 9, slidable on the shaft 8 outside of the cups, which has the squared extension 10, adapted to enter and engage the walls of the squared opening 6 of the feed and provided with a flange which abuts with the outer face of member 5, it being understood that the opening in the member or clutch part 9 is square to conform to the shaft, so as to rotate therewith.

12 indicates a suitable form of seed-spout adapted to be detachably connected with the seed-cup to receive the grain or seed discharged by the feed and discharge it onto the ground. The seed-spout has a hood portion 13, which overlaps the exposed portion of the feed and a portion of the cup and is designed to be attached to the cup, which supports the same by the spring-arms 14, which have perforations 15 to slip over studs or pins 16, projecting from the sides of the parts or sections 1 and 2 of the cup, as shown in Figs. 1 and 2. The hoods of the spouts are further provided with ears 17, designed after the clutch part has been caused to engage its coacting part of the feed, which locks the feed, to rotate with the shaft. The spout is attached to the cup, and the ear 17 of its hood bears adjacent to the outer face of the flange 11, as shown in Figs. 1 and 2, which retains the parts in such position. To release the clutch, it is apparent the spout must be detached, when the clutch may be moved along on the shaft.

In planting certain kinds of grain or seed it is sometimes desirable to cut out certain feed-wheels. To do this, several crude ways have been employed and with very little success; but with a device such as I show it is readily apparent any number of feed-wheels may be disconnected from the shaft and as readily reconnected when it is desired to employ all or any number of the feed-wheels. It is also possible to disconnect or reconnect the feed-wheels with the shaft at any time, the hopper filled or not, an advantage not heretofore attainable.

Fig. 6 shows a sectional view of the standard fluted feed-roller, its cup, &c., with my improved clutch devices attached thereto, the fluted roller (designated as 18) having the squared portion 19, with which the clutch part 9 engages, the roller having a hub portion corresponding to the body of the feed-wheels, and through the shaft is carried a pin 20 to prevent the separation of the roller-sections after the clutch parts have been disconnected. Cotter-pins 21 are employed, as shown, to retain the parts in position.

Modifications of the device may be employed and details resorted to without departing from the principle and scope of invention herein.

Having thus fully described my invention, what I claim, and desire to secure by Letters Patent of the United States, is—

1. In combination, a seed-cup, a drive-shaft passing through the seed-cup, a feed-wheel rotatably supported in the cup, and having an extended clutch part, a member slidable on the shaft having a clutch part adapted for engagement with the clutch part of the wheel, and a seed-conveying spout detachably supported on the seed-cup and having means for retaining the clutch parts in a fixed relation, substantially as specified.

2. In a seeding-machine, the combination of a seed-cup, a feed-wheel, a drive-shaft on which the wheel is carried, a clutch part on the shaft adapted to engage a portion of the feed-wheel to fix it to the shaft, a seed-spout having a hood overlapping an exposed portion of the feed-wheel, an extension of the hood adapted to retain the clutch and wheel in a locked relation to rotate with the shaft, and the pins 16 of the cup and arms 14 of the spout to facilitate in connecting the spout to the cup, substantially as specified.

3. In combination, a feed-wheel having a body provided with a squared seat portion and a circular opening, a drive-shaft passing through the openings in the wheel, and a member rotatably attached to the shaft having a squared portion adapted to the squared seat portion in the wheel for fixing the wheel to the shaft, substantially as described.

4. In a seeding-machine, the combination of a seed-cup, a feed-wheel, a drive-shaft on which the wheel is loosely carried, a clutch part on the shaft adapted to engage a portion of the feed-wheel to fix it to the shaft, and a seed-spout having a detachable connection with the cup by means of spring-arms 14 carried thereby and the pins 16 of the cup, and means on the spout for retaining the clutch part in a locked relation with the wheel, substantially as specified.

In testimony whereof I affix my signature in presence of two witnesses.

LUTHER E. ROBY.

Witnesses:
C. H. PATTISON,
CHAS. W. LAPORTE.